United States Patent Office 3,705,173
Patented Dec. 5, 1972

3,705,173
PROCESS FOR PREPARING ALKYL 2-BENZIMIDAZOLECARBAMATES
Charles D. Adams, Newark, and Joel B. Wommack, Jr., Claymont, Del., assignors to E. I. du Pont de Nemours and Company, Wilmington, Del.
No Drawing. Filed Sept. 16, 1970, Ser. No. 72,804
Int. Cl. C07d 49/38
U.S. Cl. 260—309.2
6 Claims

ABSTRACT OF THE DISCLOSURE

The alkyl esters of 2-benzimidazolecarbamic acid are prepared by reacting the alkyl esters of 4-(2-aminophenyl)-allophanic acid or 3-thioallophanic acid with an acid followed by neutralization to isolate the product.

The product alkyl esters of 2-benzimidazolecarbamic acid are useful as fungicides and as intermediates for other fungicides.

BACKGROUND OF THE INVENTION 2-benzimidazolecarbamic acid, alkyl esters are useful as fungicides and as intermediates in the preparation of benomyl, 1-(n-butylcarbamoyl)-2-benzimidazolecarbamic acid, methyl ester, and the dialkyl esters of 1-carboxy-2-benzimidazolecarbamic acid. These latter compounds and their fungicidal activity are set forth in detail in U.S. Pat. 2,933,504.

Belgian Pat. 720,987 describes the production of these 2-benzimidazolecarbamic acid, alkyl esters by the reaction of the alkyl bis(alkyl or arylthio)methyleneaminoformates with o-phenylenediamines.

U.S. Pat. 3,010,968 describes another process for making alkyl esters of 2-benzimidazolecarbamic acid by reacting thiourea with dimethyl sulfate to produce 2-methylthiopseudourea sulfate. This reaction product is then treated with an alkyl chloroformate and a base to produce an acylated 2-methylthiopseudourea, which is then reacted further with an o-phenylenediamine in the presence of a protonic acid to produce the desired compound.

SUMMARY OF THE INVENTION

This invention relates to a new process whereby alkyl esters of 2-benzimidazolecarbamic acid are prepared by first reacting certain allophanic or thioallophanic acid alkyl esters with an acid, followed by neutralization according to this equation:

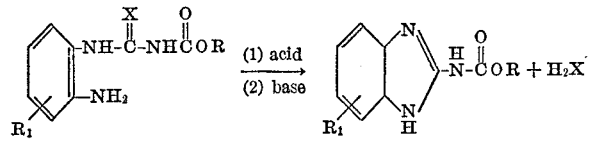

wherein

R₁ is hydrogen or alkyl of 1 to 4 carbons, preferably hydrogen;
R is methyl or ethyl, and X is oxygen or sulfur, preferably sulfur.

DETAILED DESCRIPTION OF THE INVENTION

The allophanic or thioallophanic acid alkyl ester reactants of the process of the invention may or may not be substituted on the aromatic ring with other alkyl groups and have the following structural formula:

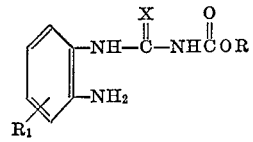

where

R₁ is hydrogen or alkyl of 1 to 4 carbon atoms;
R is methyl or ethyl, and X is oxygen or sulfur.

The thioallophanic acid, alkyl ester starting materials can be prepared by the methods known in the art, e.g., South African patent application 69/4,362.

Thus, the alkyl esters of 4-(2-aminophenyl)-3-thioallophanic acid can be prepared by a reaction which is described by the following equations.

(1) $$ROCOCl + KNCS \longrightarrow ROCONCS + KCl$$

(2)
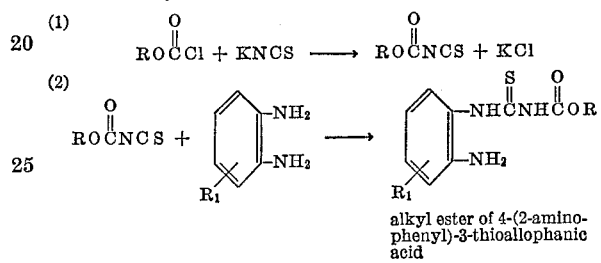

alkyl ester of 4-(2-aminophenyl)-3-thioallophanic acid

Allophanic acid esters are prepared from methoxycarbonyl or ethoxycarbonyl isocyanate [J. Het. Chem. 6, 262 (1969)] as described by the following equation:

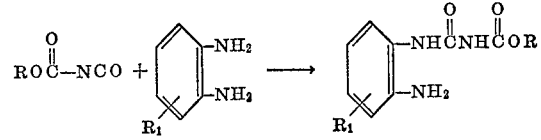

An exemplary embodiment of this process for making the intermediate is as follows:

Methyl 4-(2-aminophenyl)-3-thioallophanate

Methyl chloroformate (47.5 parts) is added with cooling to 48.8 parts of potassium thiocyanate in 200 parts of acetone. The reaction mass is stirred for an hour at ambient temperature and filtered. The filtrate is then added with cooling to 54.0 parts of o-phenylenediamine in 80 parts of acetone. The reaction mass is stirred for an hour at ambient temperature and then evaporated to dryness. The residue is taken up in 180 parts of methanol, cooled, and filtered in order to recover the product. This procedure gives 16.0 parts of methyl 4-(2-aminophenyl)-3-thioallophanate, M.P. 187° C. with decomposition.

In the process of this invention the appropriate alkyl thioallophanate is reacted with an acid followed by neutralization.

The useful acids are broad in scope. Thus, they include mineral acids such as hydrochloric, sulfuric, phosphoric, nitric, boric or hydrobromic; carboxylic acids such as formic, acetic, benzoic, oxalic, tartaric, malic, citric, lactic, propionic, butyric, toluic, or hydroxy acetic. Other acids can also be used such as sulfonic acids, sulfamic acids, carbonic and hydrogen sulfide. The mineral acids are preferred.

In the process of the invention the base used is not critical since its only function is to neutralize the salt formed by the reaction with the acid, thus permitting isolation of the product. For example, any basic alkali metal or alkaline earth metal compound, or quaternary ammonium hydroxide, e.g., tetramethylammonium hydroxide or benzyltrimethylammonium hydroxide, or tertiary amines, e.g., trimethylamine, triethylamine, triethanolamine or triethylenediamine, can be used. Alkali metal and alkaline earth metal hydroxides are preferred, although oxides, carbonates and bicarbonates can be used.

The process of the invention is conveniently conducted in a solvent. The choice of solvent is not critical. Some suitable solvents are water; lower alcohols such as methanol, ethanol, isopropanol, butanol, and amyl alcohol; organic solvents such as benzene, toluene, dioxane, dimethylformamide, dimethylsulfoxide, ketones, carbon tetrachloride, methylene chloride, chloroform and ethylene chloride; and liquid sulfur dioxide or mixtures of these solvents.

The preferred solvents are water and water miscible solvents, with water being the most preferred for economic reasons.

The reaction temperature is not critical. Temperatures of 50° C. to reflux at atmospheric pressure are preferred. The reaction time can vary from 10 minutes to 5 hours, a preferred time being 1 to 3 hours. The end of the reaction can be determined by analyzing for benzimidazole product or, in the case of the thioallophanate, by the end of $H_2S$ evolution.

The reaction can be carried out at reduced, increased or atmospheric pressure, and will generally be carried out at atmospheric pressure.

Concentration of the reactants is not critical and the reaction may be run in dilute solutions or in a slurry that is barely stirrable. For economic reasons a concentration of 20–25% is preferred.

The ratio of acid to allophanic or thioallophanic reactant can be from a 10% molar excess to a 100 fold excess. The preferred ratio is in the range of 2 to 20 parts acid to each part reactant.

The order of addition of reactants is not critical. Either the acid can be added to the allophanic or thioallophanic reactant, vice versa, or they can be combined simultaneously.

The pH range of the reaction can be from pH 6 to that of concentrated mineral acid. The preferred range is pH 1–3.

During the neutralization with base, the desired product will precipitate. Thus, the completion of precipitation is an indication that all of the product has been formed. The temperature of neutralization is not critical, but preferably it is conducted between 15° C. and 40° C.

The products are all solids and conventional solids-handling methods such as filtration, centrifugation, and spray-drying can be used for product recovery. Often the product will contain inorganic impurities which are removable by water washing techniques. Organic impurities can be removed by washing with solvents such as methanol, ethanol, acetone, and methyl ethyl ketone.

The following examples should serve to better illustrate the nature of this invention; all parts are parts by weight unless otherwise indicated.

EXAMPLE 1

Preparation of 2-benzimidazolecarbamic acid, methyl ester

Methyl 4-(o-aminophenyl)-3-thioallophanate (9 parts) is added with stirring to 100 parts of 4 N hydrochloric acid. The mixture is heated at reflux for 1½ hours and complete solution is obtained. The reaction mixture is cooled to room temperature and the pH adjusted to pH 10 with 50% sodium hydroxide. The reaction mixture is then filtered and the solid washed with water and air dried. This results in a yield of 7.5 parts of 2-benzimidazolecarbamic acid, methyl ester, or a yield of 98% based on the methyl 4-(o-aminophenyl)-3-thioallophanate.

EXAMPLE 2

2-benzimidazolecarbamic acid, ethyl ester

Ethyl 4-(o-aminophenyl)-3-thiallophanate (10 parts) is added with stirring to 50 parts of 4 N hydrochloric acid. This mixture is heated at reflux for 1½ hours. The reaction mixture is cooled to room temperature and the pH adjusted to 10 with 50% sodium hydroxide. The reaction mixture is filtered and washed with water and air dried yielding 2-benzimidazolecarbamic acid, ethyl ester.

EXAMPLE 3

2-benzimidazolecarbamic acid, methyl ester

Methyl 4-(o-aminophenyl) allophanate (10 parts) prepared from o-phenylenediamine and methoxycarbonyl isocyanate, is added with stirring to 50 parts of 4 N hydrochloric acid. This mixture is heated at reflux for 1½ hours, cooled to room temperature and neutralized with 50% sodium hydroxide. The reaction mixture is filtered and the solid is washed with water and air dried, yielding 2-benzimidazolecarbamic acid, methyl ester.

EXAMPLE 4

5(6)-methyl-2-benzimidazolecarbamic acid, methyl ester

Methyl 4-(2-amino-4-methylphenyl)-3-thioallophanate (10 parts) is added with stirring to 100 parts of 4 N hydrochloric acid. The mixture is heated at reflux for 1½ hours. The reaction mixture is cooled to room temperature and the pH adjusted to 10 with 20% potassium hydroxide. The reaction mixture is filtered and the solid is washed with water and air dried yielding 5(6)-methyl-benzimidazolecarbamic acid, methyl ester.

EXAMPLE 5

5(6)-butyl-2-benzimidazolecarbamic acid, methyl ester

Methyl 4 - (2-amino-4-butylphenyl)-3-thioallophanate (10 parts) is added with stirring to 100 parts of 4 N hydrochloric acid. This reaction mixture is heated at reflux for 1½ hours and then cooled to room temperature. The pH is then adjusted to 10 with 50% sodium hydroxide. The reaction mixture is filtered and the white solid is washed with water and air dried, yielding 5(6)-butyl-2-benzimidazolecarbamic acid, methyl ester.

EXAMPLE 6

2-benzimidazolecarbamic acid, methyl ester

Methyl 4-(o-aminophenyl)-3-thioallophanate (9 parts) is added with stirring to 8 parts of sulfuric acid and 20 parts of water. This reaction mixture is heated at reflux for 1½ hours and then cooled to room temperature and the pH adjusted to 10 with 50% sodium hydroxide. The reaction mixture is filtered and the solid is washed with water and air-dried yielding 2-benzimidazolecarbamic acid, methyl ester.

EXAMPLE 7

2-benzimidazolecarbamic acid, methyl ester

Methyl 4-(o-aminophenyl)-3-thioallophanate (9 parts) is added to 50 parts of acetic acid and 50 parts of water. This reaction mixture is heated at reflux for 1½ hours and then cooled to 20° C. The reaction mixture is filtered and the solid washed with water and air-dried. This results in a yield of 6 parts (79%) of 2-benzimidazolecarbamic acid, methyl ester.

EXAMPLE 8

2-benzimidazolecarbamic acid, methyl ester

Methyl 4-(o-aminophenyl) - 3 - thioallophanate (10 parts) is added to 30 parts of methanol and 6 parts of hydrogen chloride. This reaction mixture is refluxed for 1½ hours and cooled to room temperature and neutralized with 20% sodium hydroxide. The reaction mixture is filtered and the solid is washed with water, yielding 2-benzimidazolecarbamic acid, methyl ester.

We claim:

1. A process for making an alkyl 2-benzimidazolecarbamate consisting essentially of reacting an allophanic acid alkyl ester of the formula

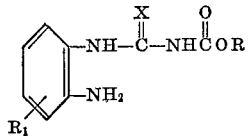

wherein
R is methyl or ethyl,
$R_1$ is hydrogen or alkyl of 1 to 4 carbons, and
X is oxygen or sulfur
with an acid at a pH having a maximum of 6 and neutralizing the alkyl 2-benzimidazolecarbamate salt formed with base.

2. The process of claim 1 wherein the acid is selected from hydrochloric, sulfuric, phosphoric, nitric, boric, hydrobromic, formic, acetic, benzoic, oxalic, tartaric, malic, citric, lactic, propionic, butyric, toluic, hydroxyacetic, sulfonic, sulfamic, carbonic or hydrogen sulfide.

3. The process of claim 1 wherein the acid is hydrochloric, sulfuric, phosphoric, nitric or hydrobromic.

4. The process of claim 1 where X is sulfur and $R_1$ is hydrogen.

5. The process of claim 2 wherein the base is an alkali metal or alkaline earth metal oxide, hydroxide, carbonate or bicarbonate.

6. A process for preparing 2-benzimidazolecarbamic acid, methyl ester consisting essentially of reacting methyl 4-(2-aminophenyl)-3-thioallophanate with hydrochloric acid at a pH of from 1-3 and at a temperature between 50° C. and reflux and neutralizing the hydrochloride salt formed with sodium hydroxide.

References Cited

UNITED STATES PATENTS

| | | | |
|---|---|---|---|
| 3,455,948 | 7/1969 | Otedman | 260—309.2 |
| 3,010,968 | 11/1968 | Loux | 260—309.2 |
| 3,431,274 | 3/1969 | Schulenberg | 260—309.2 |
| 3,562,290 | 2/1971 | Fawzi | 260—309.2 |

OTHER REFERENCES

Derwent Belgian Patents Report No. 13/69, Nos. 721,233–721,601.

Abstract of 720,987, London, Derwent, 1969 (issued Apr. 30, 1969).

NATALIE TROUSOF, Primary Examiner

U.S. Cl. X.R.

260—454, 471 C, 478, 999